United States Patent Office

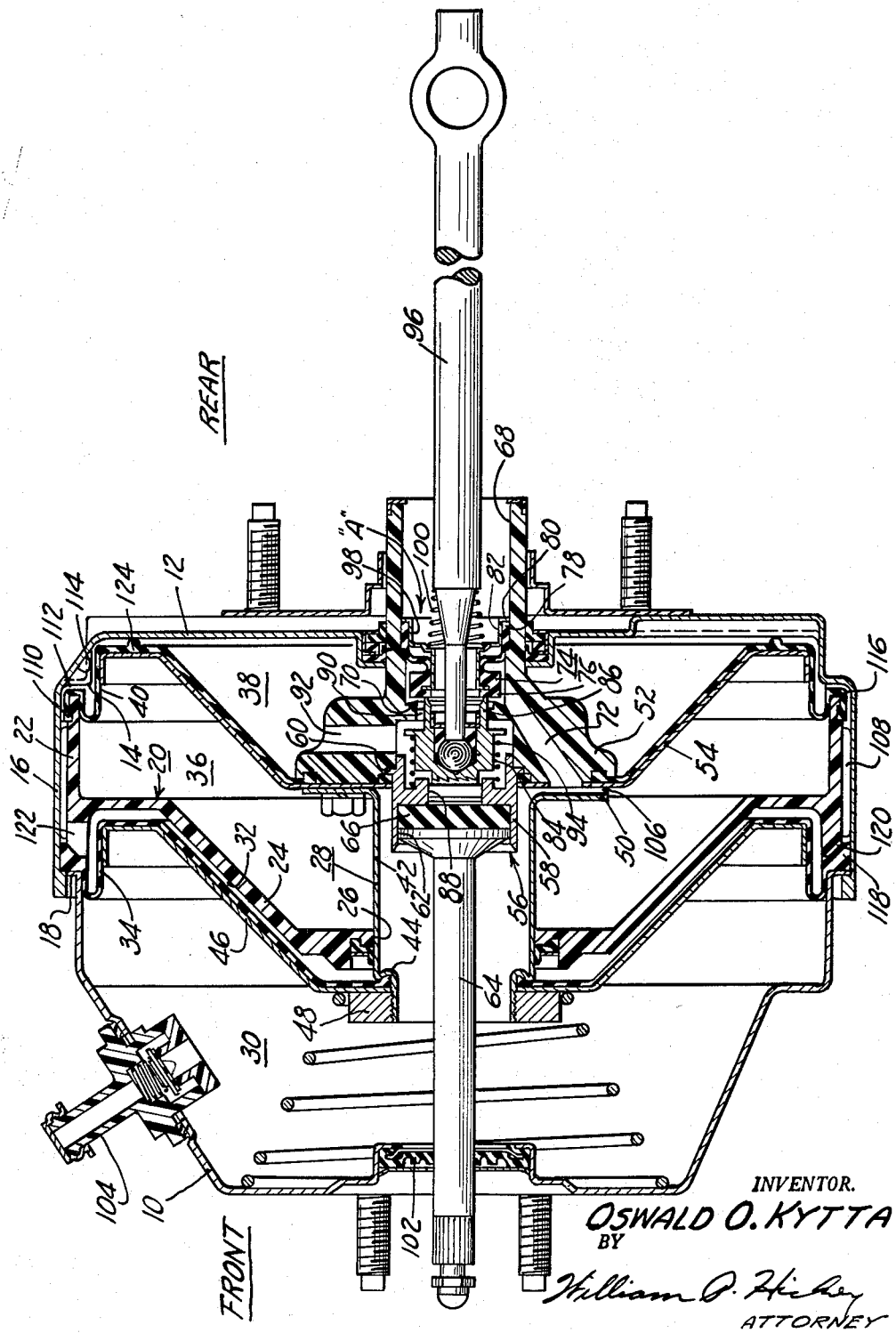

3,096,689
Patented July 9, 1963

3,096,689
SIMPLIFIED TANDEM DIAPHRAGM FLUID
PRESSURE MOTOR
Oswald O. Kytta, South Bend, Ind., assignor to The
Bendix Corporation, a corporation of Delaware
Filed Jan. 30, 1961, Ser. No. 85,521
4 Claims. (Cl. 91—376)

The present invention relates to tandem diaphragm fluid pressure motors; and more particularly to tandem diaphragm fluid pressure servomotors of the type used to operate power brakes and the like.

An object of the present invention is the provision of a new and improved tandem diaphragm fluid pressure motor in which all of the fluid flow communicating passageways are contained within the housing of the unit, and which is simple in design, inexpensive to manufacture, and efficient in its operation.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which:

The solitary FIGURE of the drawing is a cross sectional view of a tandem diaphragm fluid pressure servomotor which embodies principles of the present invention.

While the invention may be otherwise embodied, it is herein shown and described as embodied in a fluid pressure servomotor of the type used to power actuate the hydraulic braking systems of automotive vehicles.

The housing of the servomotor shown in the drawing is formed by two generally cup-shaped housing sections 10 and 12 which are fitted together to form the housing of the servomotor unit. The rear housing section 12 has a shoulder 14 which faces its opened end and has a generally cylindrically shaped sidewall section 16 between the shoulder 14 and the open end of the housing section 12. The front cup shaped housing section 10 has a radially turned flange portion 18 at its open end, which flange portion 18 has a periphery which is slidingly received in the sidewall section 16 and is suitably clamped in place.

The housing of the servomotor is divided into two power sections by means of a partition member 20 which has a generally cylindrical section 22 that is positioned between the shoulders 14 and 18, and a radially inwardly extending flange portion 24 which extends across the inside of the servomotor. The radially inwardly extending flange portion 24 has a centrally located opening 26 therein through which a central hub portion 28 extends. The portion of the servomotor forwardly of the partition member 24 is divided into opposing power chambers 30 and 32 by the diaphragm or movable wall 34; and the portion rearwardly of the partition member 24 is divided into opposing power chambers 36 and 38 by the diaphragm or movable wall 40.

The hub portion 28 is a generally tubular structure, for reasons which will later be explained, and may be made in a variety of ways. As shown in the drawing, the hub portion 28 is formed by means of a steel stamping having a shoulder 44 thereon against which the diaphragm 34 is clamped by means of a diaphragm back-up plate 46 and threaded nut 48. The rear end of the tubular stamping 42 is provided with a flange 50, against which a rearwardly extending hub extension 52 is suitably bolted to close off the central passage of the hub member 28. The hub extension 52 extends through the rear end wall of the servomotor to provide a tubular conduit through which a pressure fluid can be conducted. A diaphragm back-up plate 54 is positioned between the flange 50 and hub extension 52, with the diaphragm 40 clamped between the back-up plate 54 and the hub extension 52 to effect a suitable seal therewith. Inasmuch as the fluid pressure motor shown in the drawing is a servomotor, a suitable control valve structure A is provided in the hub extension 52 to control the operation of the servomotor. The fluid pressure servomotor shown in the drawing is what is known as a vacuum suspended unit in which vacuum of the same intensity is normally communicated to all of the opposing power chambers 30, 32, 36 and 38. When it is desired to actuate the servomotor, atmospheric pressure enters the rear end of the tubular hub extension 52 to the control valve structure A which thereafter communicates it to the power chambers 32 and 38 to move the diaphragms 34 and 40 forwardly.

The hub extension 52 is a generally tubular structure whose inner end is closed off by a reaction producing structure 56. The reaction producing structure comprises a generally cylindrically shaped barrel 58 having a shoulder 60 that is clamped between the hub extension 52 and the diaphragm back-up plate 54 with a suitable seal interpositioned therebetween. The forward end of the barrel 58 has a reaction chamber 62 therein into which the headed end of driven rod 64 extends. A block or rubberlike material 66 is interpositioned between the head of driven member 64 and the rear surface of the reaction chamber 62 to develop an internal pressure which corresponds generally to the force being applied to the driven member 64, for reasons which will later be explained.

The central opening 68 in the hub extension 52 extends from the reaction producing structure 56 outwardly through the rear surface of the member and contains a radially inwardly extending shoulder or vacuum valve seat 70. The central opening 68 is partitioned into a vacuum chamber by means of a flexible diaphragm poppet 74 having a stiffened flange portion 76 positioned for abutment with the vacuum valve seat 70. The diaphragm poppet 74 also includes an annular rearwardly extending diaphragm 78 which is fitted up against a small shoulder 80 to effect a seal with respect to the sidewalls of the central opening 68. The diaphragm portion 78 is held into sealing engagement with the sidewalls by means of a retainer ring 82 of generally Z shaped cross section; and vacuum is communicated to the vacuum valve chamber through vacuum passage 72.

The control valve structure A further includes a control member 84 which is positioned inwardly or forwardly of the vacuum valve seat 70 and has a rearwardly extending tubular portion or atmospheric valve seat 86 positioned for abutment with the flexible diaphragm poppet 74 radially inwardly of the vacuum valve seat 70. The forward end of the control member 84 extends into an opening 88 which communicates with the reaction chamber 62; so that the rubberlike material 66 can exert a rearward reaction force upon the control member 84. The space between the vacuum valve seat 70 and the atmospheric valve seat 86 forms what is known as the control chamber 90 for the valve; and the control chamber 90 is communicated to the rearwardly most opposing power chamber 38 by means of the control passage 92.

The control member 84 is normally biased rearwardly into sealing engagement with the flexible diaphragm poppet 74 by means of the valve return spring 94 to lift the poppet from the vacuum valve seat 70 and thereby normally communicate vacuum to the rear opposing power chamber 38. The control valve structure A is controlled by means of the push rod 96 which extends through the central opening 68 of the hub extension 52, and is suitably affixed to the control member 84. The flexible diaphragm poppet 74 is stiffened by a suitable spool shaped member 98, and is normally biased forwardly to effect sealing engagement with the vacuum and atmospheric valve seats by means of a biasing spring 100 positioned between the rear flange of the spool shaped member 98 and a suitable shoulder on the push rod 96.

Inward movement of the push rod 96 causes the atmospheric valve seat 86 to move forwardly, with the flexible diaphragm poppet 74 biased into a sealing engagement therewith, until the flexible diaphragm poppet 74 engages the vacuum valve seat 70, after which time, the atmospheric valve seat 86 moves out of engagement with the flexible diaphragm poppet 74 to allow air pressure to flow to the control valve chamber 90. Atmospheric pressure is thereby bled to the rearwardly most opposing power chamber 38 to build up an atmospheric to vacuum pressure differential for operating the servomotor.

As previously mentioned it is an object of the present invention to provide a servomotor construction wherein the various flow passages for conducting pressure to the various parts of the motor are totally contained within the unit. Inasmuch as the servomotor shown in the drawing is a vacuum to atmospheric pressure differential powered unit, a suitable seal 102 is provided around the push rod 64 and vacuum is communicated to the most forwardly positioned opposing power chamber 30 through the tubular check valve structure 104. Vacuum from the front opposing power chamber 30 is of course communicated through the tubular stamping 42 to the rear hub extension 52; and is communicated to the opposing power chamber 36 and vacuum valve passage 72 by means of stamped depression 106 in the flange 50 of the tubular stamping 42. It will thereby be seen that vacuum of the same intensity is continually communicated to the power chambers 30 and 36 by means of the central opening in the central hub portion 28.

According to further principles of the present invention, fluid flow communication is established between the power chambers 32 and 38 around the outside of the partition member 22, but within the housing section 16. As previously mentioned, suitable clearance 108 is provided between the partition member 22 and the cylindrical sidewalls of the housing section 16 to permit fluid flow therepast. The radially outer end of the diaphragm 40 is molded to the general shape of the rear end of the partition member 22 and includes a thickened proportion 110 for snapping into position in a suitable recess in the outer surface of the partition member. Sufficient resiliency exists in the molded diaphragm structure 40 to effect an initial seal between the partition member and diaphragm. As previously mentioned atmospheric pressure is bled to the rear opposing power chamber 38 during actuation of the servomotor; and suitable passages 112 are provided around the rear surface of the diaphragm 40 to communicate the chamber 38 with the annular space 108. The passageway 112 may be provided either by forming suitable recesses 114 in the shoulder 14, or by forming suitable projections 116 on the diaphragm 40 for abutment with the shoulder 14, or both. The projections 116 abut the shoulder 14 to suitably secure the partition member 22, and provide the sealing force which is necessary between the partition member 22 and the forward diaphragm 34. The forward diaphragm 34 has a thickened peripheral portion 118 that is clamped between the shoulder 18 and partition 22 to establish a seal therebetween. The partition member 22 is suitably beveled as at 120 so as to also wedge the thickened peripheral portion outwardly into sealing engagement with the sidewall of the housing section 16 and prevent the leakage of air therepast. A suitable opening 122 is provided through the partition member 22 forwardly of its radial flange portion 24; so that the power chamber 38 is communicated around the outside of the diaphragm 40 and partition member 22 to the power chamber 32 forwardly of the partition member 24. The rear diaphragm 40 may also be provided with rubber bumpers 124 which abut the rear end of the housing section 16 and thereby limit rearward travel of the power driven elements of the servomotor.

It will be apparent that the objects heretofore enumerated as well as others have been accomplished; and that there has been provided a fluid pressure motor of the tandem diaphragm type in which the appropriate power chambers are suitably connected entirely within the housing structure of the fluid pressure motor. Although the invention has been described as embodied in a vacuum suspended fluid pressure motor, it will be apparent that the construction shown and described can be used in other types of fluid pressure motors by making suitable minor modifications to the valving structure and pressure connections.

While the invention has been described in considerable detail, I do not wish to be limited to the particular construction shown and described; and it is my intention to cover hereby all novel adaptations, modifications, and arrangements thereof which come within the practice of those skilled in the art to which the invention relates.

I claim:

1. In a fluid pressure motor: a first generally cup-shaped housing section having a first internal shoulder facing an open end with sidewalls between said shoulder and said open end forming an opening of generally uniform cross section, a second generally cup-shaped housing section received in the open end of said first cup-shaped housing section to form a second shoulder facing said first shoulder, a partition member positioned between said shoulders, said partition member having a radially inner flange portion with a centrally located opening therethrough, a hub member whose center portion extends through said opening to effect a seal with said flange of said partition member, a first diaphragm having a peripheral portion sealingly wedged between the sidewalls of said first housing section and said second shoulder by said partition member, said first diaphragm having its radially inner portion sealed to said hub to form a first motor chamber on its side away from said partition member and a second motor chamber between said diaphragm and said partition member, a second diaphragm having an outer periphery sealingly clamped to said partition member, said second diaphragm having a radially inner portion sealed to said hub member to form a third motor chamber between said second diaphragm and said partition member and a fourth motor chamber on the opposite side of said second diaphragm member, said hub member having a flow communicating passage between said first and third motor chambers, and said partition member having a passage communicating said second motor chamber to said fourth motor chamber internally of said housing.

2. In a fluid pressure servomotor: a first generally cup-shaped housing section having a first internal shoulder facing an open end with sidewalls between said shoulder and said open end forming an opening of generally uniform cross section, a second generally cup shaped housing section received in said open end of said first cup shaped housing section to form a second shoulder facing said first shoulder, a partition member positioned between said shoulders with clearance with respect to said sidewalls of said first housing section to form an annular space, said partition member having a radially inner flange portion with a centrally located opening therethrough, a hub member whose center portion extends through said opening to effect a seal with said flange of said partition member, a first diaphragm having a peripheral portion sealingly wedged between the sidewalls of said first housing section, and said second shoulder by said partition member, said first diaphragm having its radially inner portion sealed to said hub to form a first motor chamber on its side away from said partition member and a second motor chamber between said diaphragm and said partition member, a second diaphragm having an outer periphery sealingly clamped to said partition member with a fluid flow passage between said second diaphragm and first housing section to communicate with said annular space, said second diaphragm having a radially inner portion sealed to said hub member to form a third motor chamber between said second diaphragm and said partition member and a fourth motor chamber on the opposite side of said second diaphragm member, said hub member forming a flow communicating passage between said first and third motor chambers, and said partition member having a passage communicating said second motor chamber to said annular space between said first housing section and said partition member to establish communication with said fourth motor chamber internally of said housing, a control valve carried by said hub member, means for communicating a first source of fluid pressure to said control valve, means for communicating a second source of fluid pressure to one of said first and fourth motor chambers, and said control valve communicating its control pressure to the other of said first and fourth motor chambers.

3. In a fluid pressure servomotor: a first generally cup shaped housing section having a first internal shoulder facing an open end with sidewalls between said shoulder and said open end forming an opening of generally uniform cross section, a second generally cup shaped housing section received in said open end of said first cup shaped housing section to form a second shoulder facing said first shoulder, a partition member positioned between said shoulders with clearance with respect to said sidewalls of said first housing section, said partition member having a radially inner flange portion with a centrally located opening therethrough, a hub member whose center portion extends through said opening to effect a seal with said flange of said partition member, a first diaphragm having a peripheral portion sealingly wedged between the sidewalls of said first housing section and said second shoulder by said partition member, said first diaphragm having its radially inner portion sealed to said hub to form a first motor chamber on its side away from said partition member and a second motor chamber between said diaphragm and said partition member, a second diaphragm having an outer periphery sealingly clamped to said partition member with a fluid flow passage between said second diaphragm and first housing section to communicate with said clearance, said second diaphragm having a radially inner portion sealed to said hub member to form a third motor chamber between said second diaphragm and said partition member and a fourth motor chamber on the opposite side of said second diaphragm member, said hub member forming a flow communicating passage between said first and third motor chambers, and said partition member having a passage communicating said second motor chamber to said clearance between said first housing section and said partition member to establish communication with said fourth motor chamber internally of said housing, said hub member including a control valve and a tubular portion which projects through the end wall of one of said housing sections to conduct atmospheric pressure to said control valve, means communicating a pressure differing from atmospheric to one of said first and fourth motor chambers, and said control valve communicating its control pressure to the other of said first and fourth motor chambers.

4. In a fluid pressure servomotor: a first generally cup shaped housing section having a first internal shoulder facing an open end with sidewalls between said shoulder and said open end forming an opening of generally uniform cross section, a second generally cup shaped housing section received in said open end of said first cup shaped housing section to form a second shoulder facing said first shoulder, a partition member positioned between said shoulders with clearance with respect to said sidewalls of said first housing section to form an annular space, said partition member having a radially inner flange portion with a centrally located opening therethrough, a hub member whose center portion extends through said opening to effect a seal with said flange of said partition member, a first diaphragm having a peripheral portion sealingly wedged between the sidewalls of said first housing section and said second shoulder by said partition member, said first diaphragm having its radially inner portion sealed to said hub to form a first motor chamber on its side away from said partition member and a second motor chamber between said first diaphragm and said partition member, a second diaphragm having an outer periphery sealingly clamped to said partition member with a fluid flow passage between said second diaphragm and first housing section to communicate with said annular space, said second diaphragm having a radially inner portion sealed to said hub member to form a third motor chamber between said second diaphragm and said partition member and a fourth motor chamber on the opposite side of said second diaphragm member, said hub member forming a flow communicating passage between said first and third motor chambers, and said partition member having a passage communicating said second motor chamber to said annular space between said first housing section and said partition member to establish communication with said fourth motor chamber internally of said housing, said hub member including a control valve and a tubular portion which projects through the end wall of said first housing section to conduct atmospheric pressure to said control valve, means communicating vacuum to said first motor chamber, and said control valve communicating its control pressure to said fourth motor chamber.

References Cited in the file of this patent

UNITED STATES PATENTS

| 2,467,517 | Almond | Apr. 19, 1949 |
| 2,532,462 | Rockwell | Dec. 5, 1950 |
| 2,587,404 | Stelzer | Feb. 26, 1952 |